(No Model.)
R. M. SANFORD.
DEVICE FOR JOINTING AND SETTING THE TEETH OF SAWS.
No. 351,286. Patented Oct. 19, 1886.
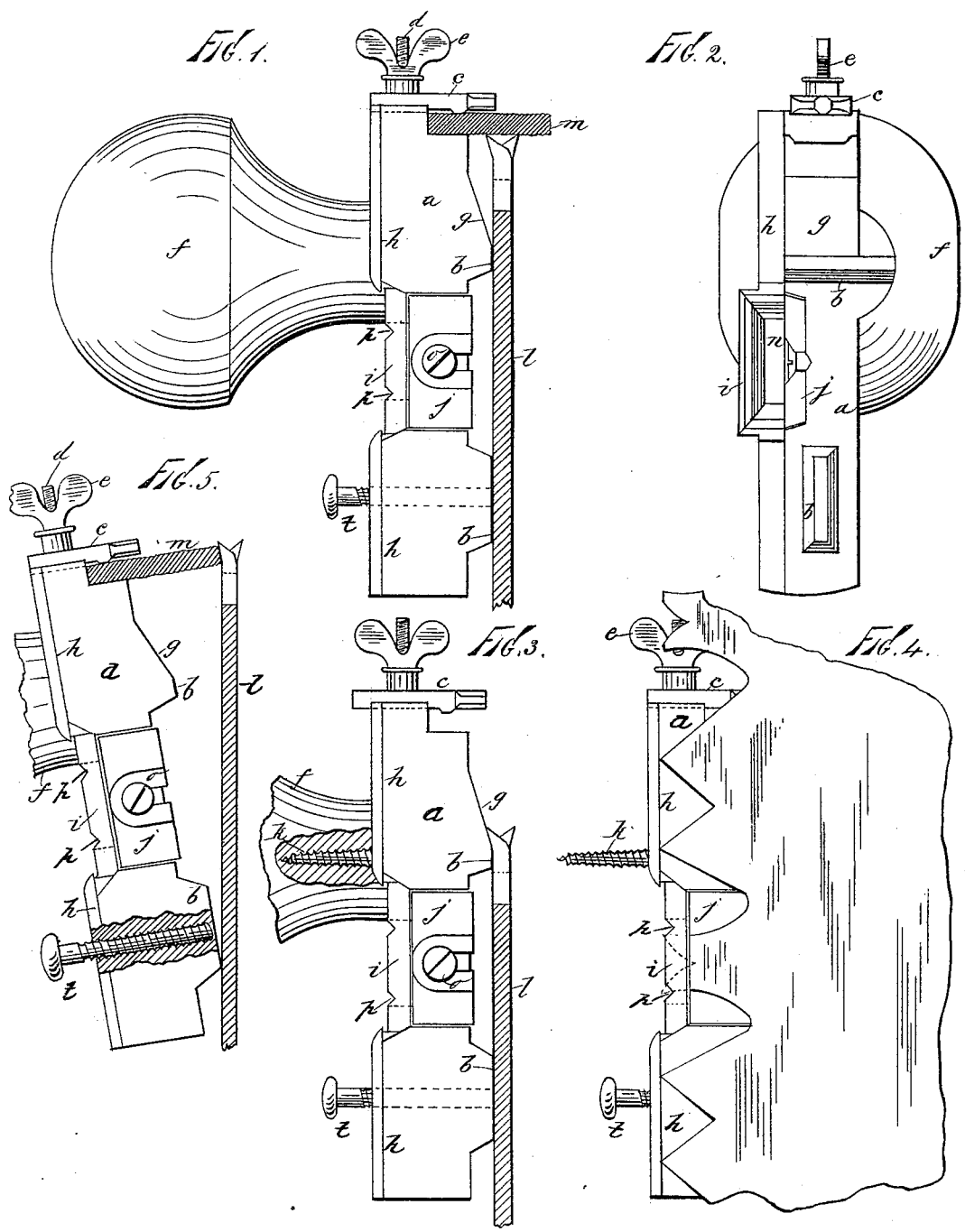
Witnesses.
Inventor.
Ross M. Sanford,
By A. P. Thayer, atty

United States Patent Office.

ROSS M. SANFORD, OF HOBART, NEW YORK.

DEVICE FOR JOINTING AND SETTING THE TEETH OF SAWS.

SPECIFICATION forming part of Letters Patent No. 351,286, dated October 19, 1886.

Application filed May 6, 1886. Serial No. 201,271. (No model.)

*To all whom it may concern:*

Be it known that I, ROSS M. SANFORD, a citizen of the United States, residing at Hobart, in the county of Delaware and State of New York, have invented new and useful Improvements in Saw-Filers, of which the following is a specification.

My invention consists of improvements in combined implements for filing, jointing, and setting the teeth of cross-cut mill and other saws generally, together with a special gager or jointer for jointing the clearer-teeth of the "champion" and other like saws having clearer-teeth intermediate to the cutting-teeth, and requiring to be jointed more or less shorter than the cutting-teeth, all as hereinafter fully described, reference being made to the accompanying drawings, in which—

Figure 1 is a side elevation of the implement and cross-section of the saw, showing the use of the implement for jointing ordinary saws. Fig. 2 is a front elevation of the implement alone. Fig. 3 is a side elevation showing the use of the implement for setting the teeth. Fig. 4 is a side elevation showing the jointing of the clearer-teeth, and Fig. 5 is a side elevation showing the dressing of the feather edges of the filed teeth.

On one end of a metallic stock, $a$, of substantially rectangular form, and having gage-ribs $b$ on one side for bearing against one side of the saw-plate $l$, I fix a clamping-jaw, $c$, with a suitable screw, $d$, and thumb-nut $e$, for clamping a jointing-file, $m$, on the end of the stock, suitably for ranging lengthwise of the teeth of a saw, and overlapping the points when the tool, which I provide with the knob-handle $f$ on the side opposite to the gage-ribs, is held thereby, with said gage-ribs, against the side of the saw, so that the teeth may be quickly and truly jointed by passing the file along the saw, as usual for this purpose.

Besides the above-described contrivance of the jaw for clamping and holding the file, I also contrive it for use, with the guide-ribs $b$, for a setting-gage, by forming the projecting end suitably for a gage-point and fixing it adjustably along the clamping-screw to enable it to be set forward or backward relatively to the gage-ribs, which, being placed against the side of the saw with the end of the clamp-gage to the point of the teeth, gage the set as in other set-gages, thus utilizing this device and the gage-ribs in common for two purposes and avoiding the duplicating of parts therefor.

For bending the points of the teeth to set them, I hold the tool firmly against the side of the saw by the knob-handle, with the gage-rib $b$, nearest the clamp-gage, suitably near the point of the tooth in hand, and strike the opposite side of the projecting point gently with a light hammer, and thus bend the point till the clamp-gage brought to the point will touch it. This upper gage-rib, over which the teeth are set, is made to range crosswise of the stock for the better position for this service, and also for a broader bearing in that direction for the better control of the device when used as a jointer; but it is preferred to arrange the other gage-rib lengthwise of the stock.

For a convenient and efficient means of effecting a slight back-set to the teeth when they may happen to be bent a little too much, I have provided the bevel-faced anvil-die $g$ on the side of the rib over which the teeth are bent, which, being fairly borne against the side of the bent point of the tooth by slightly tilting the tool, if necessary, to touch it near but a little short of the extreme point, as well as further back, will cause the tooth to straighten a little when struck on the opposite side and between the two bearing-points on said die.

The clearer-teeth jointer consists of the flange $h$ at the back of the stock, and projecting from one side suitably to rest on the points of cutting-teeth each side of a pair of clearer-teeth, together with the slotted file-guard flange $i$, located midway between the ends of flange $h$, where it is substituted for a portion of said flange, and being in a little lower plane than flange $h$, and so that the clearer-teeth project through its slot $n$ to the extent that they are to be made shorter than the cutting-teeth, so that when filed down on the points until the file is stopped by the guard-flange, said clearer-teeth will be duly gaged to the others.

For different saws and for different kinds of wood it is sometimes desirable to vary the length of the clearer-teeth, for which I make this guard-flange separately from the flange $h$ and the stock, and attach it to an adjusting-plate, $j$, fitted in suitable transverse ways in the stock a, and having a binding-screw, o, or other stop adapted to secure it in any required position.

The knob-handle will be made of wood or metal, as preferred, and is to be detachably connected to the stock, so that it may be removed for more convenient use of the instrument for jointing the clearer-teeth. It may be secured by the stud-screw k, or any other approved readily-detachable device. Thus it will be seen that I have provided simple contrivances with one and the same stock for jointing and setting the teeth of ordinary saws, and also for jointing clearer-teeth of shorter length than the cutting-teeth, so that a very simple and cheap combined implement is provided, and there is no interference in any function by any device for any other function, and for both the jointing and setting of ordinary saws substantially the same devices are used.

All the parts, except the screws, may be made of malleable iron, and require no finishing, except, perhaps, a little smoothing with a file, tapping for the screws, and case-hardening the gage-ribs, clamp, and the clearer-tooth jointer, if desired. I also provide for filing the clearer-teeth to edge after jointing them by making the angle-creases p in the face of the filing-guard i transversely, in which the corner of the file may be brought to bear on the side of the point for edging it, by one or two slight strokes. The tool will, for this purpose, be shifted along the saw in such relation to the tooth to be edged that the file will act on the curved side of the tooth—i. e., in the notch between the two clearer-teeth.

The use of the tool for dressing the feather-edges of filed teeth is represented in Fig. 5, the file being held by the clamp, same as for jointing the teeth, but placed with the edge to the sides of the teeth, with the lower corner of the lower gage-rib, b, touching the side of the saw-plate, which inclines the edge of the file correspondingly to the inclination of the teeth, so that the feather-edges may be brushed off by sliding the file forward and backward along the saw.

The inclination of the edge of the file may be varied by shifting the file outward in the clamp, and files of different widths may be used.

An adjusting-screw may be used in the lower end of the stock to vary the inclination of the tool for jointing and setting, if desired.

What I claim, and desire to secure by Letters Patent, is—

1. The combination of stock a, handle f, file-clamp jaw c, and gage-ribs b, substantially as described.

2. The combination of stock a, handle f, adjustable file-clamp jaw and tooth-gage c, and the gage-ribs b, substantially as described.

3. The combination of stock a, handle f, adjustable file-clamp jaw and tooth-gage c, gage-ribs b, and the anvil-die g, substantially as described.

4. The combination of stock a, handle f, gage-flange h, and slotted clearer-tooth gage and file-guard flange i, substantially as described.

5. The combination of stock a, gage-flange h, and adjustable slotted clearer-tooth gage and file-guard flange i, substantially as described.

6. The clearer-tooth gage i, having the filing-creases p, substantially as described.

7. The combined implement comprising the stock a, handle f, file-clamp c, gage-ribs b, gage-flange h, and slotted clearer-tooth gage and file-guard flange i, substantially as described.

In witness whereof I have hereunto signed my name in the presence of two witnesses.

ROSS M. SANFORD.

Witnesses:
M. FREDENBURG,
J. H. MERCHANT.